H. T. & A. M. SEDGLEY.
CENTRIFUGAL PULP FILTER AND STRAINER.
APPLICATION FILED MAY 15, 1908.

943,476.

Patented Dec. 14, 1909.

2 SHEETS—SHEET 1.

WITNESSES

F. E. Maynard
E. A. Penfield

INVENTORS:
Harry T. Sedgley
and Alfred M. Sedgley
BY Geo. H. Strong,
ATTORNEY

H. T. & A. M. SEDGLEY.
CENTRIFUGAL PULP FILTER AND STRAINER.
APPLICATION FILED MAY 15, 1908.

943,476.

Patented Dec. 14, 1909.
2 SHEETS—SHEET 2.

WITNESSES
F. E. Maynard.
E. A. Rinfield

INVENTORS:
Harry T. Sedgley
and Alfred M. Sedgley;
BY Geo. H. Strong
ATTORNEY

UNITED STATES PATENT OFFICE.

HARRY T. SEDGLEY AND ALFRED M. SEDGLEY, OF DIMOND, CALIFORNIA.

CENTRIFUGAL PULP FILTER AND STRAINER.

943,476.   Specification of Letters Patent.   Patented Dec. 14, 1909.

Application filed May 15, 1908. Serial No. 433,016.

*To all whom it may concern:*

Be it known that we, HARRY T. SEDGLEY and ALFRED M. SEDGLEY, citizens of the United States, residing at Dimond, in the county of Alameda and State of California, have invented new and useful Improvements in Centrifugal Pulp Filters and Strainers, of which the following is a specification.

Our invention relates to an apparatus which is especially designed for filtering solutions of gold and the like, and separating the solution from the pulp with which it is previously associated, so that the valuable solution may be recovered.

It consists in the combination of parts, and in details of construction which will be more fully explained by reference to the accompanying drawings, in which—

Figure 1:
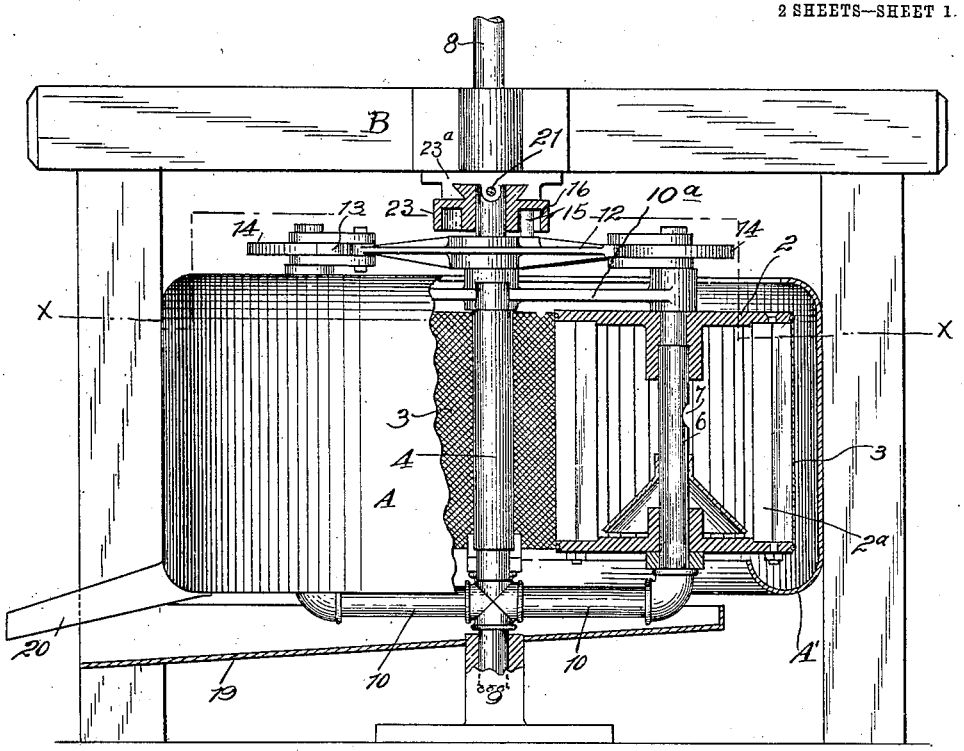
Figure 2:
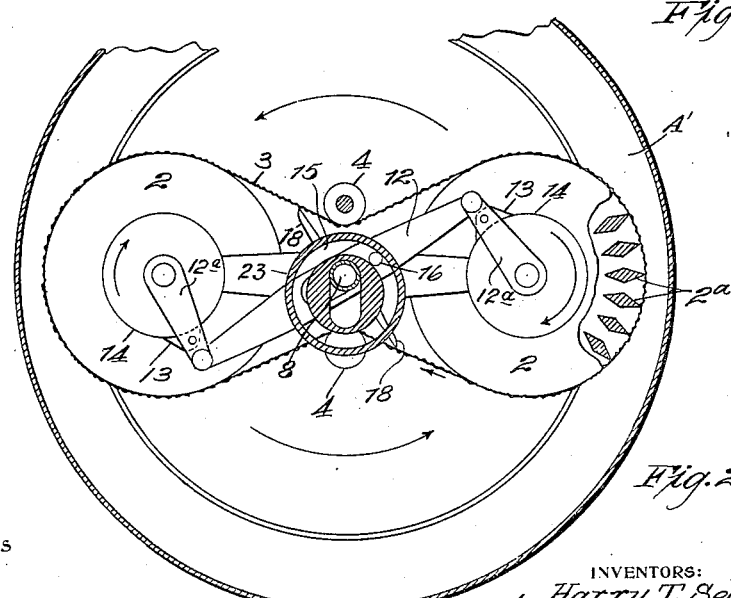
Figure 3:
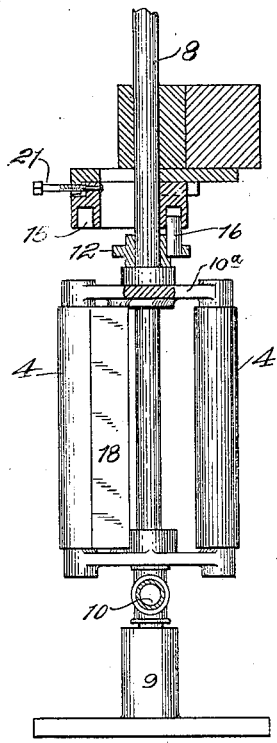
Figure 4:
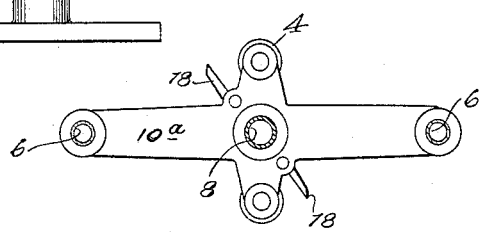
Figure 5:
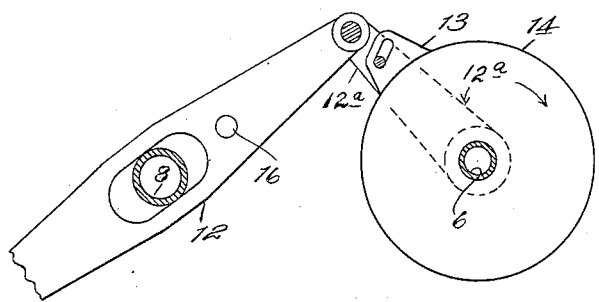

Figure 1 is a side elevation and partial section. Fig. 2 is a horizontal section through $x$—$x$ Fig. 1. Fig. 3 is a vertical section showing the central portion of the apparatus. Fig. 4 is a plan of the belt drums, central portion and the scrapers. Fig. 5 is a partial view of the belt-advancing mechanism.

It is the object of our apparatus to provide a continuously operating means for separating the solution, such as a cyanid solution, from the pulp with which it is previously mixed, and from which the gold or valuable product has been extracted, so that the solution may be afterward subjected to a process for precipitating the gold, and the pulp discharged.

As shown in the drawings, our apparatus consists of an annular casing A, the lower and exterior part of which forms a trough A′ for the reception of the solution, as will be hereinafter described.

2 are vertically journaled drums, the axes of which are located within the periphery of the casing A, and the outer surfaces of which project into the casing so as to lie substantially above the trough A′.

3 is an endless belt which passes around the drums, and also around directing drums or rollers 4, which are situated upon each side of the vertical center of the case, and nearer to the center than the exterior diameter of the drums 2 so that the belt passing around one of the drums 2, passes thence inwardly beneath one of the rollers 4, thence outwardly around the other drum 2, again inwardly around the other roller 4, thence outwardly around the initial drum 2 as plainly shown in Fig. 2. The drums 2 are composed of vertical staves $2^a$, here shown as diamond-shaped, but they may be made of any suitable or desired shape, to leave spaces between them for the reception of the pulp.

The pulp is delivered upon the belts by centrifugal action, being fed through suitable centrally located pipes 6 which are axial with the drums 2, and may have perforations 7 for the escape of the pulp. The pulp may be delivered to the apparatus through a suitable feed pipe 8 which extends downwardly forming a vertical axis. A step-bearing 9 supports the tubular shaft 8. We have here shown an upper bracket $10^a$ and tubular arms 10 extending outwardly from the lower part of this shaft, connecting by elbows with the vertical hollow shafts 6, so that the pulp will pass into these shafts, and when the apparatus is revolved within the casing, centrifugal action, caused by the revolution, will throw the pulp outwardly between the barrels or staves $2^a$ and against the inner surface of the traveling belt 3. It will be understood that the pulp might be introduced by arms connecting from the upper end of the shaft 6, this being a mere detail of convenient construction.

The whole apparatus may be propelled within the casing by means of a pulley or other attachment to the central hollow shaft, while the belt 3 is advanced by intermittent short movements so as to constantly present sufficient surfaces for the impact of the pulp against its interior, as explained below. The belt being made of suitable fibrous or porous material, it is obvious that the solid portion of the pulp will be held against the interior surface of the belt, while the liquid solution will pass through its interstices.

In order to constantly present new surfaces of the belt for the impact of the material thrown outwardly by the centrifugal force, and to provide for a means for removing the pulp after the liquid solution has been extracted, we have shown an arm 12 pivotally connected to rocker levers $12^a$ loosely journaled upon shafts 6, the outer er ¹s of which levers $12^a$ have clutch members 13 adapted to engage the friction wheels 14 of drums 2, when the arm is moved in one direction, Fig. 5, and to release them when moved in the other direction; and as these friction wheels are moved by their clutches 13 and they turn their respective belt-carrying drums, it will be seen that each oscillation will advance the belt a little.

Means of oscillation consist of an eccentric 23 adjustably secured to the frame B, having a groove or channel 15, and a pin 16 carried by the slotted arm 12 projects into the groove or channel 15 so that as the shaft 8 revolves, carrying arm 12, the eccentricity of the groove will cause the arm to oscillate, and thus actuate the clutch members, 13, to slightly revolve the drums and advance the belt. The eccentric 23 is adjustable in a casting 23$^a$ secured to the horizontal timber of the frame B, by means of the screw 21, Figs. 1 and 3.

18 are scrapers which project from the central support, and the edges contact with those portions of the belt which pass around the guide rollers 4, and as the belt is thus moved around its rollers, these knives or scrapers will remove the pulp from the surface of the belt, and cause it to drop through the central portion of the apparatus where it may be received in any suitable receptacle or conveyer as at 19. The liquid solution which has passed through the surface of the belt 2, will fall into the groove or channel A′ of the casing A, and flowing around to a suitably placed discharge spout or chute 20, will be carried away to another suitable receptacle.

It will be understood from this description that the revolution of the apparatus, including the drums about a central axis within the containing case which is stationary, will produce sufficient centrifugal action to impel the liquid through the interstices of the belt, while the belt will be constantly advanced so as to present new surfaces for the reception of the pulp, and the passage of the liquid. It is now obvious that when the shaft 8, and its associated members, the arms 10 and drums 2, have attained the desired rotary velocity about the central axis, and the drums 2 given the required intermittent or slow rotations about their respective axles 6, the pulp will, when fed down the tubular shaft 8, be thrown outwardly through arms 10 and axles 6, between staves 2$^a$, and is retained on the belt 3, by which it is gradually carried around from the points most distant from the shaft 8, where the straining efficiency is greatest (centrifugally), toward the shaft 8, where it is removed from the belt 3 by the scrapers 18. The rate at which the belt is advanced, will depend upon the eccentricity of the channel 15, or the equivalent crank or motor, and this may be regulated by an adjusting screw or equivalent 21.

Having thus described our invention, what we claim and desire to secure by Letters Patent is—

1. An apparatus for separating and filtering liquid from associated pulp, said apparatus including open-sided drums mounted and revoluble about a common center, and having an independent revolution about their own centers, a filter disposed around said drums, and means for supplying pulp and solution within the drums to be discharged by centrifugal force against the inner surface of the filter, said means including tubular shafts for the drums having side discharge openings, and a feed device connecting with said shafts.

2. In a pulp and liquid filter, vertically journaled open drums, a porous filter disposed around said drums, a vertical tubular shaft located between the drums and about which the entire structure is revoluble, tubular connections between said shaft and the interior of the drums, openings through which pulp is delivered from said tubes against the inner surface of the filter, and means for advancing the filter intermittently to receive the pulp.

3. In a filtering apparatus of the character described, vertically journaled open-sided drums, a filter disposed around said drums, a vertical tubular shaft located between the drums having tubular connections whereby associated pulp and liquid may be delivered within the drums, means for revolving the apparatus to throw the pulp outwardly against the inner surface of the filter, and means actuated in unison, by which the filter drum is advanced by successive intermittent steps.

4. In a filtering apparatus of the character described, vertically journaled open-sided revoluble drums, with a filter belt inclosing them, a common center about which said drums are revoluble, means for supplying pulp and liquid to be thrown outward against the interior of the belt, and a mechanism by which the drums are intermittently rotated upon their own axes to advance the belt and present new surfaces, and an exterior stationary casing to receive the separated liquid.

5. In an apparatus of the character described, vertical open-sided rotatable drums, a filter belt inclosing said drums, a tubular central shaft upon each side of which the drums are supported, connections between said shaft with the interior of the drums to supply material, and discharge it against the interior of the belt by centrifugal force, wheels fixed to the drum shafts, an arm, clutch members carried at the ends thereof, a centrally located grooved eccentric, and connections between said eccentric and the arm whereby the revolution of the apparatus produces an intermittent advance movement of the drums.

6. In a filtering apparatus of the character described, vertically journaled open-sided drums, a filter disposed around said drums, a centrally revoluble structure upon which the drums are carried, means for supplying pulp and delivering it within the drums to be thrown outward by centrifugal force, an inclosing casing within which the separated liquid is received, and means by which pulp is removed from the surface of the filter.

In testimony whereof we have hereunto set our hands in presence of two subscribing witnesses.

HARRY T. SEDGLEY.
ALFRED M. SEDGLEY

Witnesses:
CHARLES A. PENFIELD,
CHARLES EDELMAN.